Aug. 26, 1952 R. N. OWLER 2,608,242
CAR SEAT LEG REST
Filed Aug. 4, 1948 4 Sheets-Sheet 1
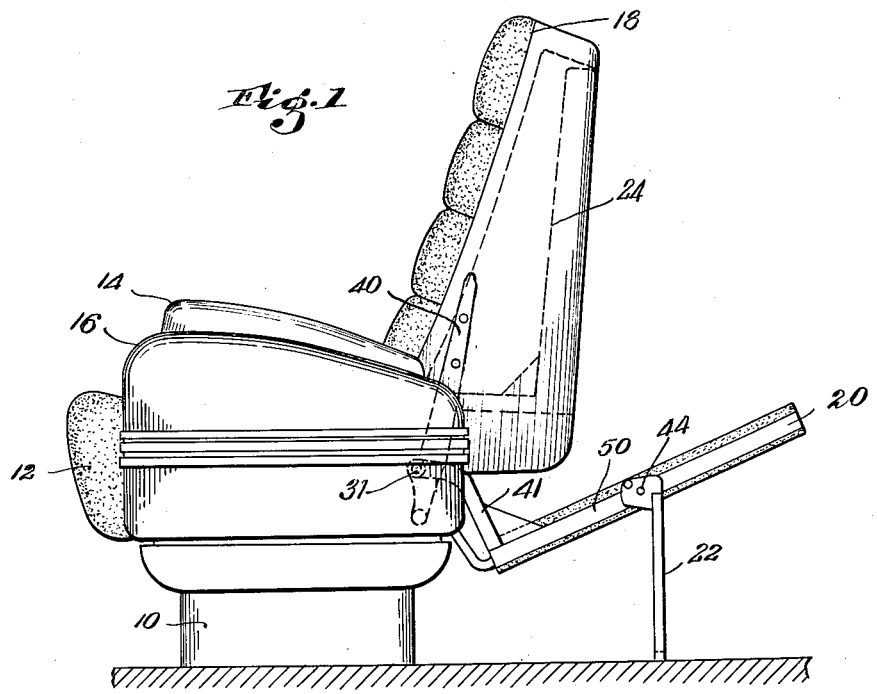
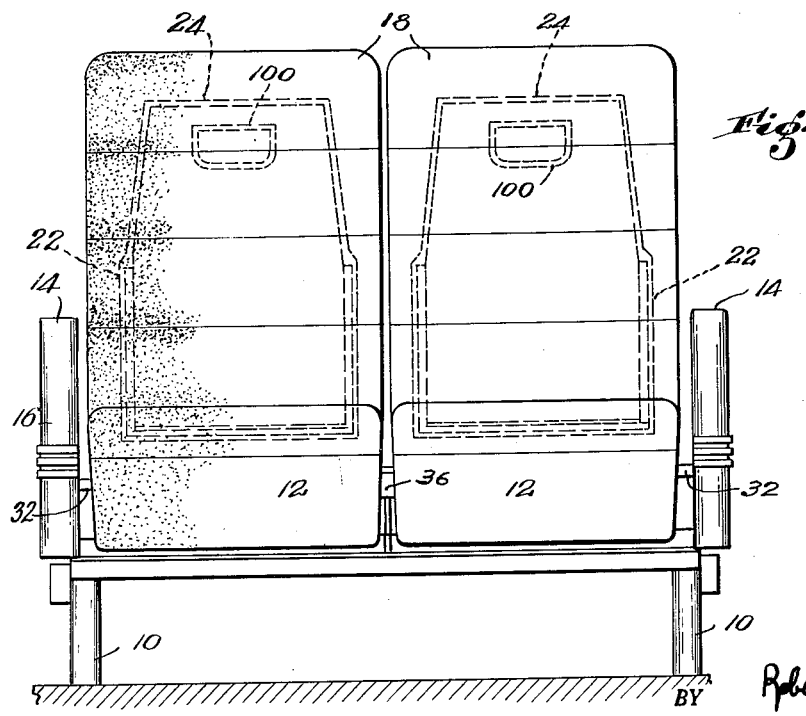
INVENTOR.
Robert N. Owler
BY Kenway, Jenney, Witter & Hildreth, Attys Aug. 26, 1952  R. N. OWLER  2,608,242
CAR SEAT LEG REST
Filed Aug. 4, 1948  4 Sheets-Sheet 2
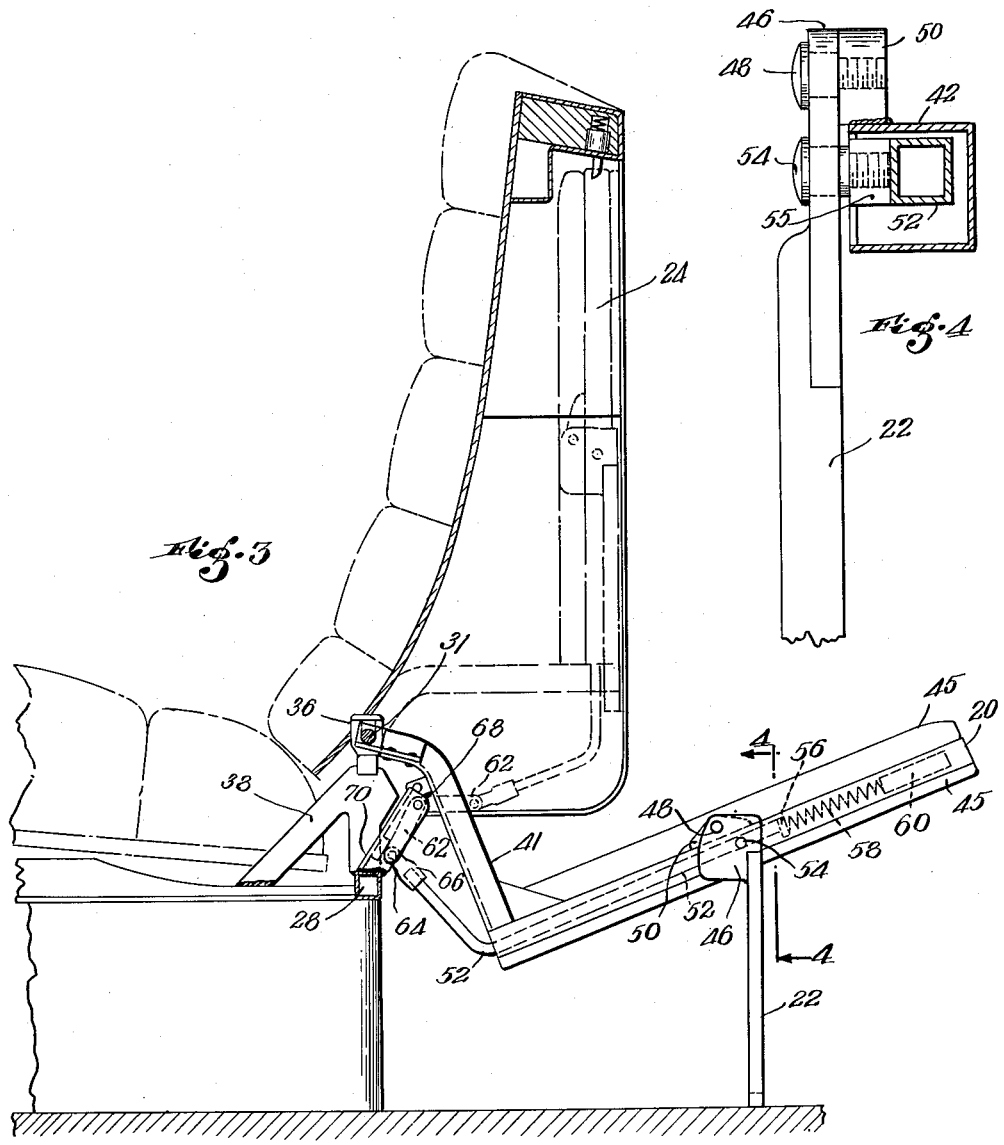
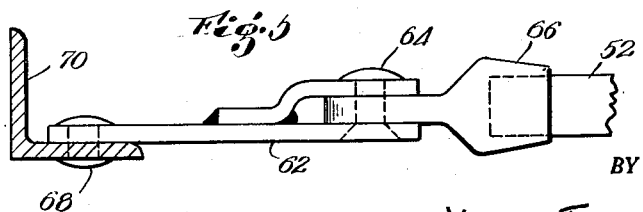
INVENTOR.
Robert N. Owler
BY Kenway, Jenney, Witter & Hildreth, Attys.

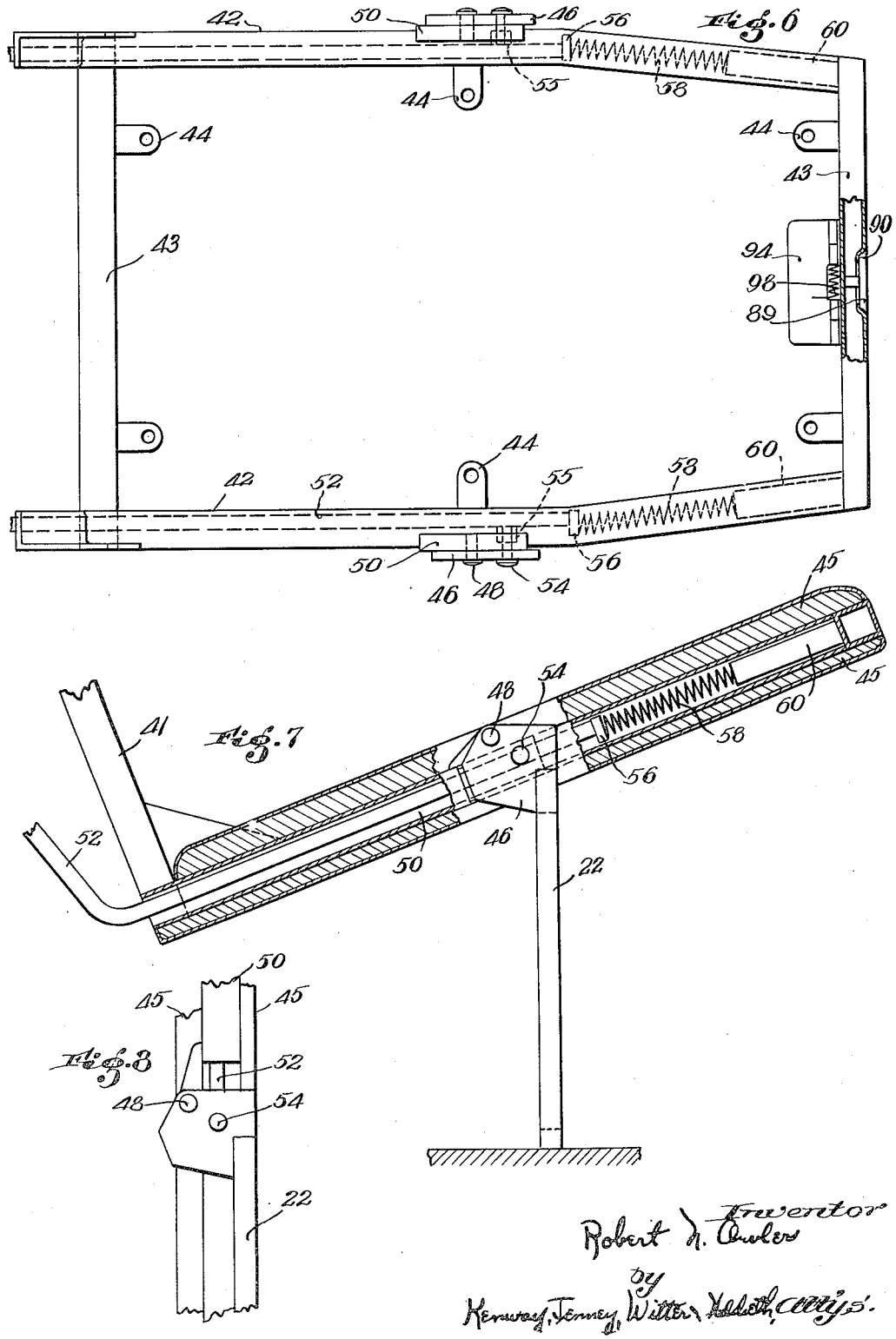

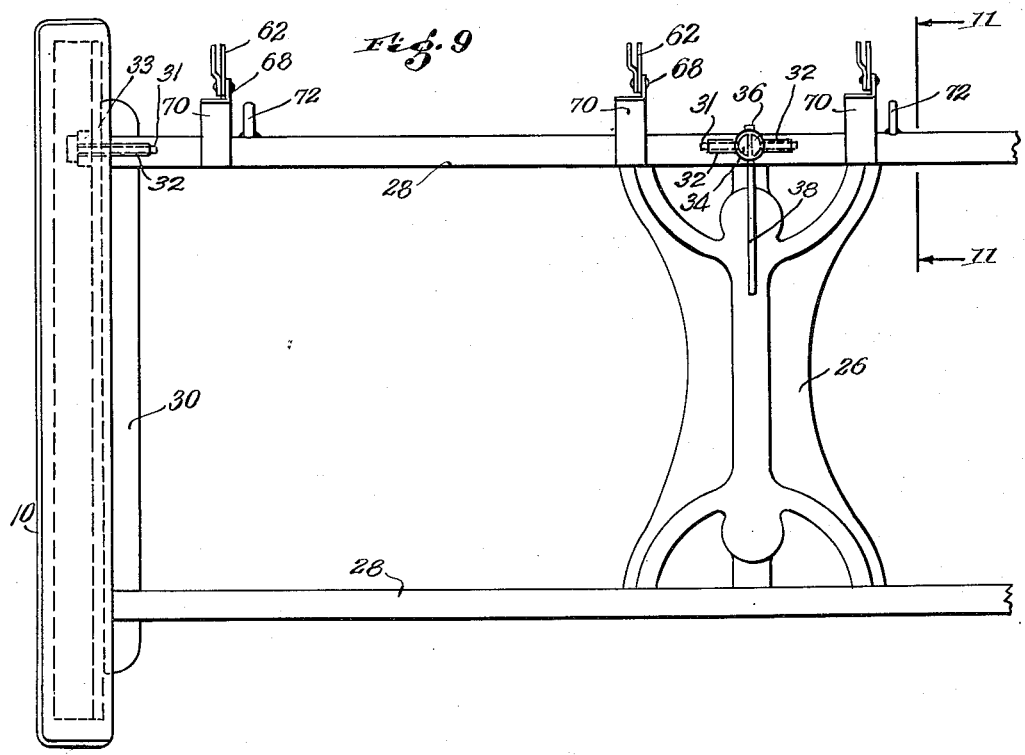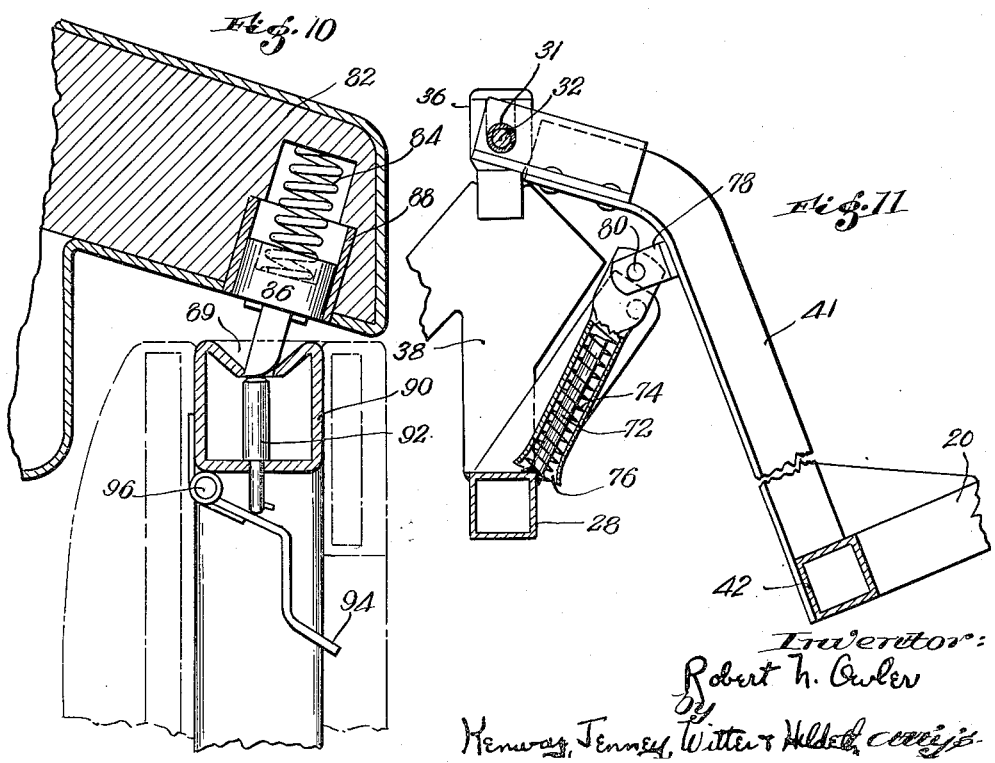

Patented Aug. 26, 1952

2,608,242

UNITED STATES PATENT OFFICE 2,608,242

CAR SEAT LEG REST

Robert N. Owler, Westminster, Mass., assignor to Heywood-Wakefield Company, Gardner, Mass., a corporation of Massachusetts Application August 4, 1948, Serial No. 42,505

1 Claim. (Cl. 155—171)

This invention comprises an improved leg rest for reclining chairs, particularly for chairs used in railways, buses, and other forms of transportation and one object of the invention is to provide a leg rest which is comfortable and conveniently accessible for the user and which may be quickly and inconspicuously stowed when not in use.

Several difficulties are confronted in the development of an efficient and practicable leg rest adapted to transportation conditions and in surmounting these difficulties certain requirements must be borne in mind. In the first place the leg rest utilized by one passenger must be independent of every other passenger to avoid annoyance and confusion in the limited space available in the coach or other vehicle. The leg rest must be relatively noiseless in operation for similar reasons. It must be readily accessible to the user without undue effort and equally simple to return to its stowed position after use. The leg rest must also be compact, restricted to the space allocated to one passenger and of neat appearance to harmonize with modern streamlined interiors.

Accordingly one feature of the present invention is its efficient utilization of space, the leg rest for each seat being stowed in a recess of the back rest of the next seat forward. Another feature comprises mounting the leg rest upon a hinge coaxial with the hinge of the back rest in which it is stowed. It should be noted in this connection that in one aspect the present invention comprises an improvement upon the copending application by Bell, Serial No. 590,346.

A further feature of the invention resides in its novel concealed spring and linkage arrangement whereby the leg rest is smoothly counterbalanced as it is lowered into working position. Conversely, restoration of the leg rest to stowed position is gently aided by the same concealed springs and linkage. As a result, efficient and quiet operation is achieved along with compactness and an attractive overall design blending well with contemporary transportation equipment.

These and other characteristics of my invention will be best understood and appreciated from the following description of a preferred embodiment thereof, selected for purposes of illustration and shown in the accompanying drawings, in which:

Fig. 1 is a side elevation of the car seat with leg rest in a position of use,

Fig. 2 is a front elevation, the leg rest being shown by broken lines in stowed position in a recess in the back rest of the chair, Fig. 3 is a side elevation of the car seat partly in section, Fig. 4 is a view in section of the leg rest support hinges taken along line 4—4 of Fig. 3, Fig. 5 is a fragmentary plan view of the link mechanism employed, Fig. 6 is a plan view, partly in section, of the leg rest frame, Fig. 7 is a side view partly in section of the leg rest, with the leg rest support in operative position, Fig. 8 is a fragmentary side view of the leg rest, with the leg rest support in non-operative position, Fig. 9 is a plan view of the seat base, Fig. 10 is a detailed view in section of the leg rest latching mechanism, Fig. 11 is a side elevation partly in section of the spring cushioning attachment and adjacent leg rest support arm.

Figs. 1 and 2 present general views of a car seat incorporating the invention. A fixed base 10 supports a recliner chair having the seats 12, the arm rests 14 mounted on a pair of side walls 16, and the back rests 18. In Fig. 1 a leg rest 20 is shown in the position of use, resting upon a supporting bracket 22, its stowed position being indicated at 24 by broken lines. Similarly in Fig. 2 the broken lines at 24 show the stowed position of the leg rest in the back rest 18. The seat, back rest and leg rest may be upholstered in a conventional manner, as shown.

The seat framework (Fig. 9) comprises a center bracket 26 with U-shaped end portions secured at either end to two parallel square transverse tubes 28, in turn secured at either end of the double seat to the brackets 30 (only one of which is shown). The brackets 30 are affixed along their length to the base supports 10. Toward the rear of the seat frame, paralleling the rear tube 28 are shown in dotted lines pivot pins 31, carrying sleeves 32 about which swings the leg rest. The left pivot pin 31 is threaded into a boss 33 in the support member 10. On the right in this view, the two central pivot pins 31, having semispherical ends 34, fit into the cylindrical bearing member 36 which is welded to the top of a stationary triangular bracket 38, as shown in Fig. 11. The bracket 38 is vertically secured by welding or otherwise to the center bracket 26. Fig. 2 illustrates the relative position of the sleeves 32 and the bearing member 36 with respect to the general organization of the car seat assembly.

Both the back rest 18 and the leg rest 20 swing about the pins 31. In Fig. 1 is shown an upright arm 40 supporting the back rest 20 pivotally on the pins 31. Similarly, as shown in Fig. 11, an obtuse-angled leg rest bracket 41 rocks at its lower end upon the sleeve 32 while its upper end is fastened to the framework of the leg rest 20.

Thus when the leg rest is stowed in the position of the broken lines 24 the leg rest and the back rest will rock as a unit about the axis of the pins 31 as the back rest is adjusted by the occupant of the forward seat 12. However, if the occupant of the rearward seat (not shown) desires to lower the leg rest he may do so without disturbing the person in the forward seat because the mounting renders the back rest and the leg rest independent of each other. It follows also that when the leg rest is in lowered or used position as in Fig. 3, the back rest may be moved freely without interfering with the position of the leg rest.

The leg rest (Fig. 6) is constructed about a framework consisting of two generally parallel square tubes 42 forming the side members and a similar pair of tubes 43 at right angles to the tubes 42 and joined to them at the corners of the leg rest, forming the end members. Six brackets 44 furnish means of attaching conventional upholstered sections 45 (Fig. 7) on either face of the leg rest.

The U-shaped support bracket 22 stands vertically while sustaining the leg rest 20 in its position of use (Fig. 7). In the stowed position of the leg rest the bracket 22 assumes a flush parallel relation to the leg rest (Fig. 8). Transition from one position to the other is accomplished by a novel combination of elements which will now be described. It will be understood that while only one side of the support bracket 22 is visible in Figs. 3, 5 and 7 to which reference will generally be made, the other side of the bracket and leg rest is identical as may be seen by reference to Fig. 6.

Each top end of the U-shaped bracket 22 is welded to a pentagonal metal plate 46 which in turn (Fig. 4) pivots upon a metal screw 48 threaded into a flange 50 welded to the top central portion of the square cross-sectioned metal tube 42 extending along either side of the leg rest 20 (Fig. 6). A thrust arm or operating bar 52 is pivotally affixed to the plate 44 by means of the pin 54 which is threaded into a lug 55 welded or otherwise secured to the arm 52. The arm 52 consists of a square tube. It is concentric with respect to the tube 50 and sufficiently smaller in cross-section so that as the plate 46 pivots about the screw 48 the arm 52 at the screw 54 will describe an arc without striking the walls of the tube 42.

The upper end of each thrust arm 52 carries a disc 56 which bears against one end of a compression spring 58, the other end of which thrusts against a stop 60 in the end of the tube 42. Fig. 6 shows how the spring 58 adapts itself to the tapered conformation of the leg rest.

The position of the leg rest support 22 is controlled by a linkage comprising the thrust arm or link 52 and a short link 62 forked at one end and affixed at the forked end to the thrust arm by means of a rivet 64 and a lug 66 (Fig. 3). At its opposite end the link 62 is pivotally affixed by a rivet 68 to an inclined angle bracket 70 which in turn is welded at its lower end to the transverse base section 28. These elements are shown in more detail by the plan view of Fig. 5.

A shock absorber mechanism, operating to retard the descent of the leg rest, is provided as shown in Figs. 9 and 11. It consists of an upstanding inclined pin 72 secured to the transverse bracket 28 and carrying a compression spring 74 which fits loosely over the pin 72, and a short tube 76 surrounding the pin 72 and the spring 74. The top of the tube 76 is flattened and pivotally secured to a lug 78 on the leg rest bracket 41 by means of a rivet 80. The operation of this mechanism will be explained below.

When the leg rest 20 is in stowed position as in Fig. 3 it is retained there by means of the latch mechanism shown in detail in Fig. 10. A wooden top cross-member 82 of the frame of the back rest 18 is recessed to admit a compression spring 84 which thrusts against a latch or plunger 86 which slides in the metal casing 88. The plunger 86 in locked position is engaged by a depression 89 at the top of a small metal box 90 which is flush with the end of the leg rest 20. A pin 92 extends through the bottom of the box 90 into yielding contact with the plunger 86. A convenient handle 94 pivotally mounted on a pin 96 is maintained by the coiled spring 98 (Fig. 6) in a position of only slight contact with the pin 92. However, when the handle 94 is rocked upward the pin 92 slides up releasing the plunger 86 from the depression 89 in the top of the box 90, thus permitting the leg rest 20 to be swung into the position of use. The location of the latch handles 94 mounted in the back rests 18 is shown by the broken lines at 100 in Fig. 2.

The operation of the leg rest mechanism, proceeding from the stowed position to use position, and return, will now be described, with principal reference to Fig. 3. Starting with the stowed position (indicated by the broken lines 24) the leg rest is withdrawn from the recess it occupies by a pull upon the handle 94 (Fig. 6) which simultaneously releases the latch mechanism above described. As the leg rest rocks out from its stowed position gravity exerts a torque upon it which unless counterbalanced would cause the leg rest to fall abruptly with much inconvenience and possibly with injury to the user. This counterbalancing force is supplied in part by the compression spring 74. As the leg rest moves from its upright stowed position to a position approximately midway in its rotation downward about the axle 32, the compression spring 74 operates to oppose downward motion. A sudden release or fall of the leg rest is thus eliminated, and little exertion is required either to lower or to raise the leg rest because of the counterbalancing action of this spring.

It has been remarked that while the leg rest is in stowed position the support bracket 22 lies in flush relationship to the remainder of its body. This condition prevails during that part of the descent of the leg rest described above. However, as the leg rest bracket 41 rotates clockwise about the pins 31 it will be noted that the link 62 rotates about the rivet 68 as an axis. When this latter rotation has continued for a little more than ninety degrees the link comes to rest against the angle bracket 70. Continued rotation of the leg rest bracket 41 causes outward relative movement of the thrust arm 52. This movement is transmitted to the pivot formed by the screw 54, where it causes counterclockwise rotation of the plate 46 about the screw 48. As the plate 46 pivots on the screw 48, the support bracket 22 swings from its flush, stowed position to vertical. To cushion the descent of the leg rest, however, this motion is opposed by the spring 58, which is compressed between the disc 56 and the stop 60. Therefore this latter portion of the lowering arc of the leg rest is subject to the combined retardation of the spring 74 and spring 58, and the leg rest quietly glides to a stop upon the upright support bracket 22.

Stowing the leg rest requires little effort since the two springs 58 and 74 partially counteract the force of gravity. As the leg rest is raised from its position of use the compression spring 58 acting against the thrust arm 52 in a leftward direction aids such movement. During the early portion of the return arc, while the link 62 is still held in contact along its length with the angle bracket 70, this conduces to two results, first, the plate 46 is rocked in a clockwise direction and the support bracket 22 is brought back to flush relation with the leg rest, and second, the reaction of the spring 58 as it presses against the stop 60 operates to help elevate the leg rest and minimize the manual force required. When the leg rest is in this general location it is subject to the combined lifting effect of both springs 58 and 74. As the leg rest support bracket 22 resumes its flush position, and the thrust arm 52 moves away from the angle bracket 70 (rotating the link 62 in a counterclockwise direction), lifting pressure from the spring 58 is no longer supplied, but the spring 74 is now in such position to contribute a direct upward thrust upon the leg rest bracket 41 helping restore the leg rest to its stowed position. The leg rest therefore, rocks readily from the near horizontal position of use to the vertical stowed position with minor application of effort by the user.

Having now described and illustrated a preferred embodiment of my invention, what I claim as new and desire to secure by Letters Patent of the United States is:

In a vehicle chair having a leg rest pivotally connected to the rear of said chair to move from an elevated stowed position adjacent to the back of said chair to a lowered position for use by the occupant of the chair next to the rear; the combination of, a compression spring mounted on said chair and bearing against said leg rest at a point below its pivot axis to urge said leg rest into the stowed position; a support bracket pivotally connected to said leg rest for movement from a stowed position parallel to said leg rest to a support position substantially normal to said leg rest; an operating bar slidably connected to said leg rest and pivotally connected at its upper end to said support bracket at a point apart from the pivot axis of the said support bracket, the lower end of the operating bar extending below the lower end of the leg rest and below the pivot axis thereof, and being adapted to come into positive contact with said chair by pivotal movement about the axis of the leg rest when said leg rest is pivoted part-way downward for use, whereby such downward pivotal movement of said leg rest will cause said operating bar to contact said chair and thereafter to slide up said leg rest and to pivot said support bracket into the opened supporting position; and an operating bar spring connected to said leg rest and bearing against said operating bar to urge the same longitudinally downward of said leg rest, whereby the said compression spring and the said operating bar spring cooperate to pivot the leg rest upward from a fully lowered position, but the said compression spring alone pivots the leg rest into the final fully closed position.

ROBERT N. OWLER.

REFERENCES CITED

The following references are of record in the file of this patent:

UNITED STATES PATENTS

| Number | Name | Date |
|---|---|---|
| 1,479,345 | Walton | Jan. 1, 1924 |
| 1,504,762 | Hultgren | Aug. 12, 1924 |
| 1,800,494 | Bayer | Apr. 14, 1931 |
| 2,481,943 | Murphy et al. | Sept. 13, 1949 |